US012794058B2

(12) United States Patent
Takatsuji

(10) Patent No.: US 12,794,058 B2
(45) Date of Patent: Nov. 10, 2026

(54) BATTERY PACK, METHOD FOR MANUFACTURING BATTERY PACK, ELECTRIC VEHICLE, AND ELECTRIC TOOL

(71) Applicant: MURATA MANUFACTURING CO., LTD., Kyoto (JP)

(72) Inventor: Hideyasu Takatsuji, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 466 days.

(21) Appl. No.: 18/522,619

(22) Filed: Nov. 29, 2023

(65) Prior Publication Data

US 2024/0186632 A1 Jun. 6, 2024

Related U.S. Application Data

(63) Continuation of application No. PCT/JP2022/021276, filed on May 24, 2022.

(30) Foreign Application Priority Data

Aug. 5, 2021 (JP) ................................ 2021-128802

(51) Int. Cl.

*H01M 50/213* (2021.01)
*H01M 10/48* (2006.01)
*H01M 10/61* (2014.01)
*H01M 50/516* (2021.01)

(52) U.S. Cl.

CPC ......... *H01M 50/213* (2021.01); *H01M 10/48* (2013.01); *H01M 10/61* (2015.04); *H01M 50/516* (2021.01); *H01M 2220/30* (2013.01)

(58) Field of Classification Search

None
See application file for complete search history.

(56) References Cited

U.S. PATENT DOCUMENTS

| | | | |
|---|---|---|---|
| 2012/0058374 A1 | 3/2012 | Aota et al. | |
| 2015/0243947 A1 | 8/2015 | Seto et al. | |
| 2017/0365838 A1 | 12/2017 | Okada et al. | |
| 2021/0210821 A1 | 7/2021 | Okada et al. | |
| 2022/0407187 A1* | 12/2022 | Chung | B23K 26/242 |
| 2023/0299432 A1* | 9/2023 | Kwon | H01M 10/052 429/211 |

FOREIGN PATENT DOCUMENTS

| | | |
|---|---|---|
| JP | 2012054203 A | 3/2012 |
| JP | 2018010843 A | 1/2018 |
| JP | 2021015177 A | 2/2021 |
| WO | 2014/064888 A1 | 5/2014 |
| WO | 2016/157262 A1 | 10/2016 |
| WO | 2017/130706 A1 | 8/2017 |

OTHER PUBLICATIONS

International Search Report of corresponding PCT application PCT/JP2022/021276, dated Aug. 2, 2022.

* cited by examiner

*Primary Examiner* — Carlos Barcena
(74) *Attorney, Agent, or Firm* — K&L Gates LLP

(57) ABSTRACT

A battery pack is provided and including: a battery cell having a terminal; and a conductive member electrically connected to the battery cell, in which a metal portion having a melting point of 85° C. or higher and 450° C. or lower is provided at least between the conductive member and the terminal, and the conductive member has a through-hole formed therein that exposes at least a part of the metal portion.

10 Claims, 14 Drawing Sheets

A

B

BATTERY PACK, METHOD FOR MANUFACTURING BATTERY PACK, ELECTRIC VEHICLE, AND ELECTRIC TOOL

CROSS REFERENCE TO RELATED APPLICATIONS

The present application is a continuation of PCT patent application PCT/JP2022/021276, filed on May 24, 2022, which claims priority to Japanese patent application no. 2021-128802, filed on Aug. 5, 2021, the entire contents of which are incorporated herein by reference.

BACKGROUND

The present application relates to a battery pack, a method for manufacturing a battery pack, an electric vehicle, and an electric tool.

Battery packs having a plurality of battery cells are widely used as one of power sources in electric vehicles, electric tools, and the like. In a battery pack, a plurality of battery cells is electrically connected to each other by forming a state in which terminals of the battery cells and a conductive member such as a bus bar are electrically connected as shown in Patent Documents 1 and 2 in a welding step such as laser welding.

In one technique described, a protrusion serving as a terminal of a battery cell and a welding surface around the protrusion are provided, a through-hole is provided in a welding plate portion of a bus bar, and the inner end edge of the through-hole is welded to the welding surface.

In another technique described, a bus bar and an electrode tab are joined through a metal member, and a clad material is used as the metal member.

SUMMARY

The present application relates to a battery pack, a method for manufacturing a battery pack, an electric vehicle, and an electric tool.

The one technique identified in the Background section, described not only welding the inner end edge of the through-hole to the welding surface but also having a portion to be welded to the terminal through the bus bar (through-welding portion), requires irradiating a high-power laser in order to laser-weld the through-welding portion. At this time, a large amount of heat is transferred to the battery by high-power laser irradiation. Therefore, in the one technique, there is room for improvement in terms of suppressing defects such as performance degradation of the battery due to a large amount of transferred heat (hereinafter, also referred to as thermal damage). The another technique described and identified in the Background section also has room for improvement in terms of suppressing thermal damage.

The present application relates to providing, in an embodiment, a battery pack capable of suppressing thermal damage, an electric vehicle and an electric tool including the battery pack, and a method for manufacturing the battery pack.

The present application, in an embodiment, relates to a battery pack including:

- a battery cell having a terminal; and
- a conductive member electrically connected to the battery cell,
- in which a metal portion having a melting point of 85° C. or higher and 450° C. or lower is provided at least between the conductive member and the terminal, and
- the conductive member has a through-hole formed therein that exposes at least a part of the metal portion.

The present application, in an embodiment, relates to an electric tool and an electric vehicle including the battery pack.

In addition, the present application, in an embodiment, relates to a method for manufacturing a battery pack, the method including:

- a step of forming a composite member having: a conductive member with a through-hole formed therein; and a metal member having a melting point of 85° C. or higher and 450° C. or lower and provided so as to cover an inner region of the through-hole;
- a first step of disposing the composite member to a battery cell having a terminal such that the metal member and the terminal face each other; and
- a second step of melting the metal member with heat applied to at least a part of an exposed region of the metal member, which is exposed to an inner region of the through-hole, to weld the terminal and the metal member.

The present application, in an embodiment, relates to providing a battery pack capable of suppressing thermal damage, an electric vehicle and an electric tool including the battery pack, and a method for manufacturing the battery pack.

BRIEF DESCRIPTION OF THE FIGURES

FIG. 1, view B is a sectional view illustrating the state of the longitudinal section taken along the line IB-IB in FIG. 1, view A.

FIG. 2, view B is a sectional view illustrating the state of the longitudinal section taken along the line IIB-IIB in FIG. 2, view A.

FIG. 10, view B is a sectional view illustrating the state of the section taken along the line XB-XB in FIG. 10, view A. FIG. 10, view C is a plan view for illustrating another example of a composite member.

FIG. 10, view D is a sectional view illustrating the state of the section taken along the line XD-XD in FIG. 10, view C.

DETAILED DESCRIPTION

Figure 1:
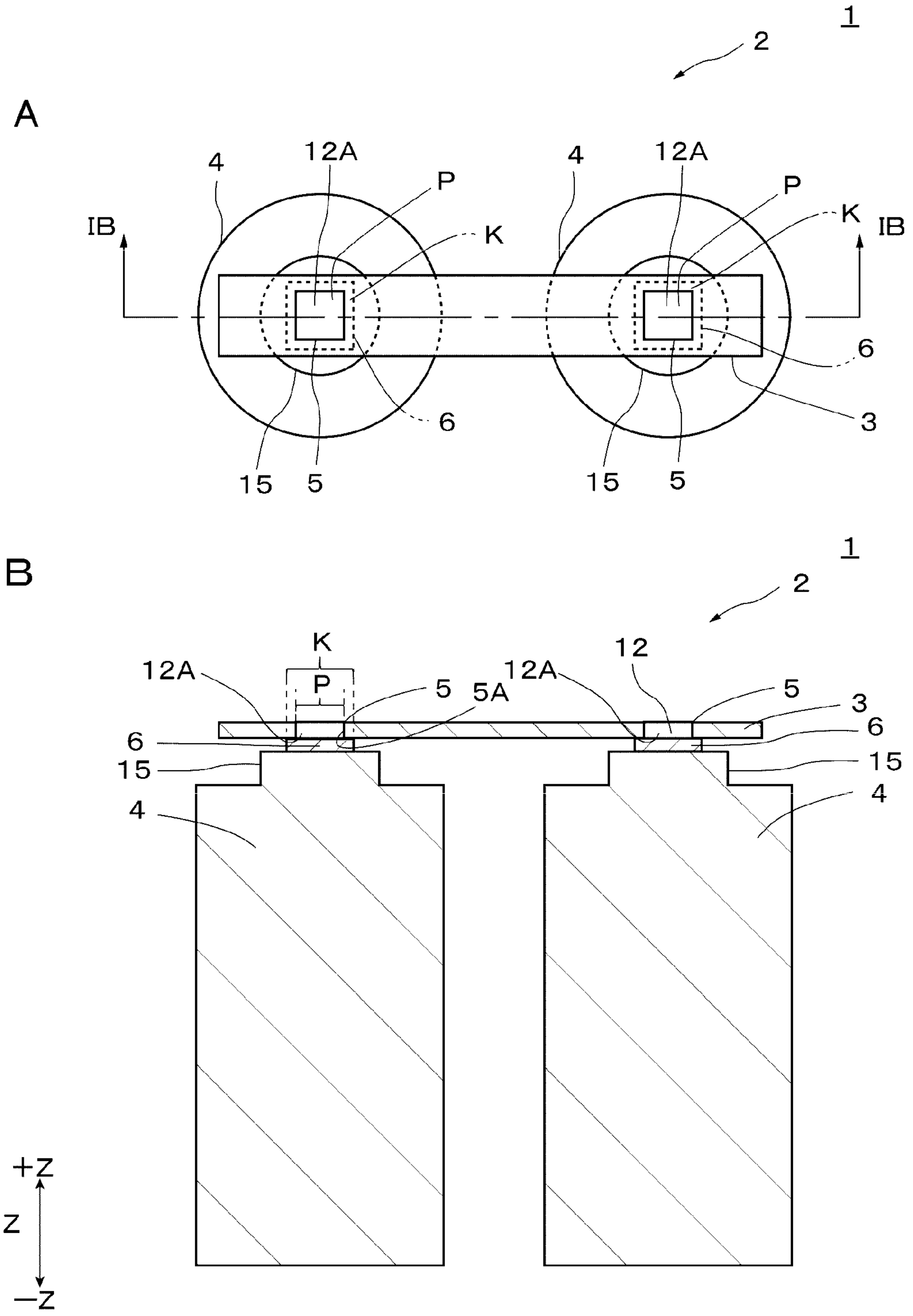
FIG. 1, view A is a plan view illustrating an example of a battery pack according to the first embodiment.
Figure 2:
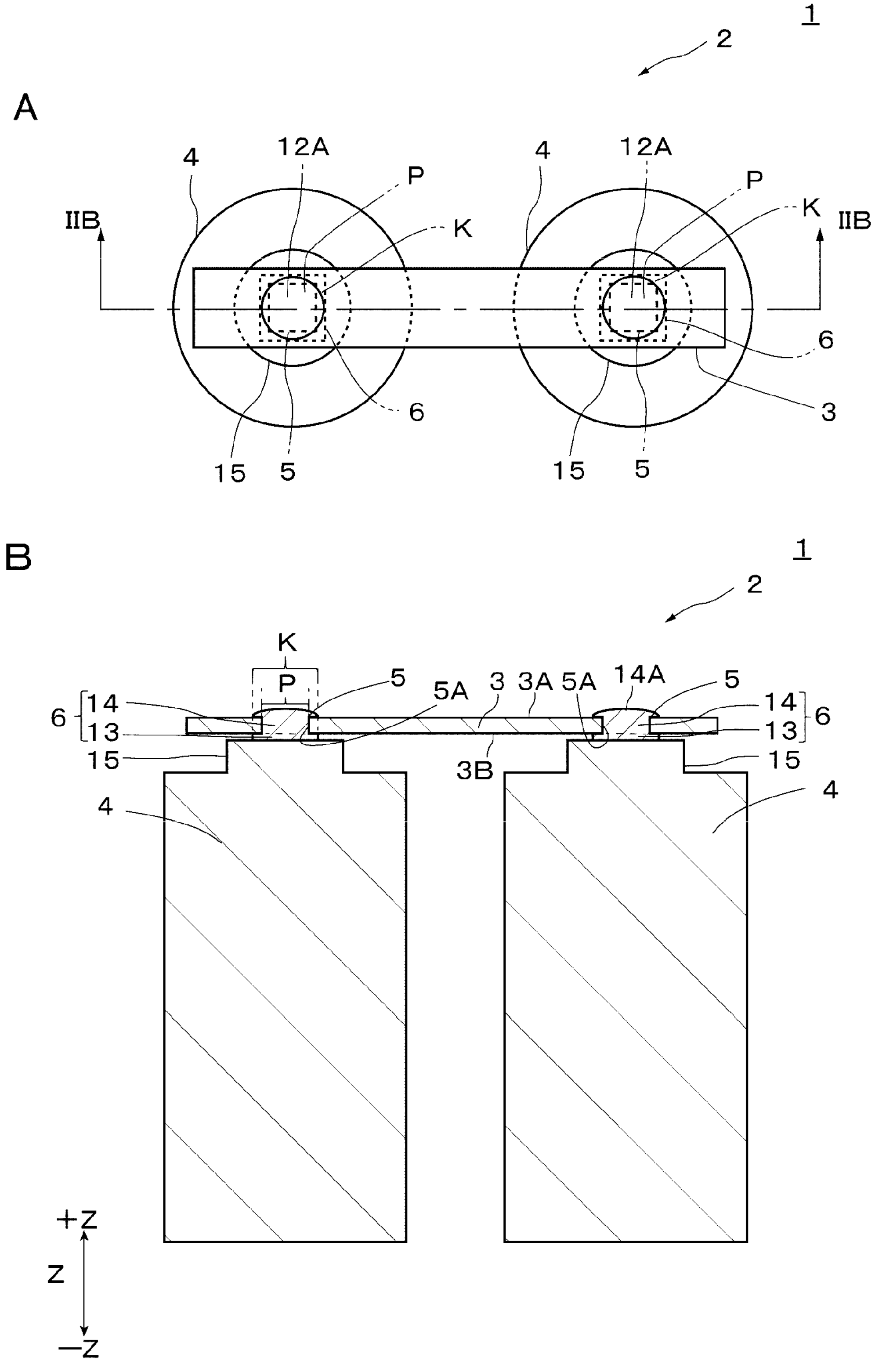
FIG. 2, view A is a plan view illustrating an example of a battery pack according to the first embodiment.

Embodiments of the present application will be described below in further detail. The present application is not limited to embodiments and the like described herein. In the following descriptions, directions such as frontward and backward, leftward and rightward, and upward and downward directions are indicated in consideration of convenience of description, but the contents of the present application are not limited thereto. In the examples of FIGS. 1B and 2B, it is assumed that the Z-axis direction corresponds to the vertical direction (the upper side is +Z direction, and the lower side is −Z direction), and the description will be made based on this. The same applies to FIGS. 3, 4, 6, and 12. Unless otherwise specified, the relative magnitude ratio of the size and thickness of each part illustrated in each drawing of FIG. 1 is described for convenience, and does not limit the actual magnitude ratio. The same applies to the views of FIGS. 2 to 14 regarding these definitions for direction and magnitude ratios.

A battery pack 1 according to an embodiment will be described with reference to FIGS. 1A, 1B, and the like according to an embodiment. FIGS. 1A and 1B are views for illustrating main parts in an embodiment of the battery pack 1.

The battery pack 1 according to an embodiment has an assembled battery structure 2.

The assembled battery structure 2 includes battery cells 4 and a conductive member 3. In the example illustrated in FIGS. 1A, 1B, and the like, the assembled battery structure 2 of the battery pack 1 has a structure in which a plurality of the battery cells 4 (two battery cells 4 in the illustrated example) are electrically connected to the conductive member 3. In FIG. 1B, for convenience of description, the detail of the section of the battery cell 4 is omitted. The same applies to FIGS. 2, 3, and 12, in each of which the detail of the section of the battery cell 4 is omitted.

The conductive member 3 electrically connects the battery cells 4. Specific examples of the conductive member 3 include a metal tab and a bus bar. As the material of the conductive member 3, a metal material having a melting point higher than the melting point of a metal portion 6 (the melting point of a metal member 9) described later is used. Specifically, copper or the like is suitably used as the material of the conductive member 3.

The conductive member 3 illustrated in the example of FIGS. 1A and 1B is formed in a rectangular plate shape. However, this does not limit the shape of the conductive member 3, which may be determined according to conditions such as the shape of the battery cell 4 and the space around the assembled battery structure 2.

A through-hole 5 is formed at a predetermined position in the conductive member 3. The through-hole 5 exposes at least a part of the metal portion 6 described later. The through-hole 5, seen in a direction from the metal portion 6 toward a terminal 15 (in the example of FIG. 1B, −Z axis direction), is formed in a portion corresponding to a region including at least a part of a region K in which the terminal 15 of the battery cell 4, which will be described later, and the metal portion 6 face each other.

In the example of FIG. 1A, one through-hole 5 is formed corresponding to one of the battery cells 4 connected to the conductive member 3. In this example, the through-hole 5 is constituted by one through-hole 12A formed as a through-hole having a rectangular window shape. However, this does not limit the formation number and shape of the through-hole 5 of the conductive member 3 to the example of FIG. 1A.

Figure 3:
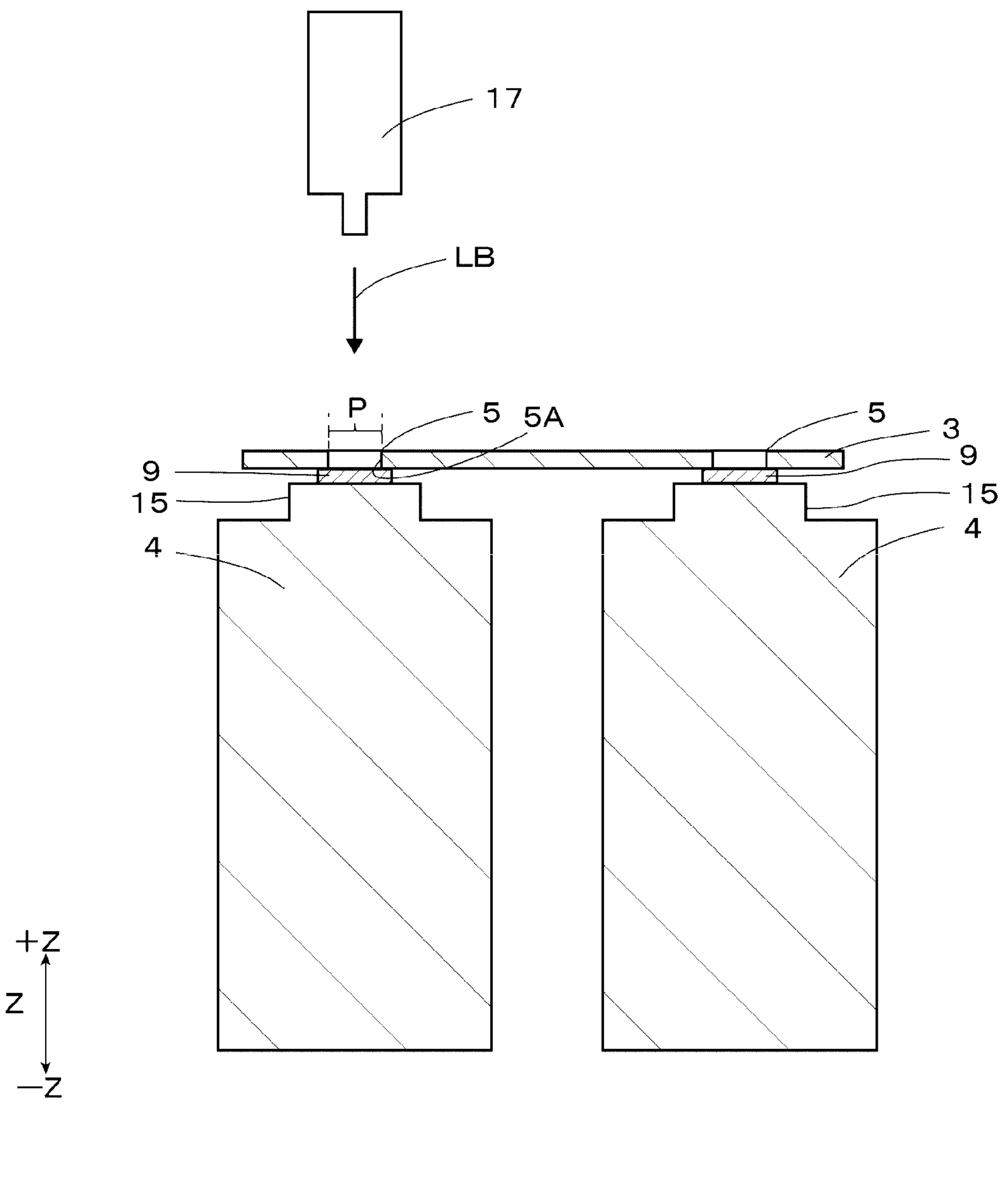
FIG. 3 is a sectional view for illustrating a manufacturing process of a battery pack according to an embodiment.
Figure 4:
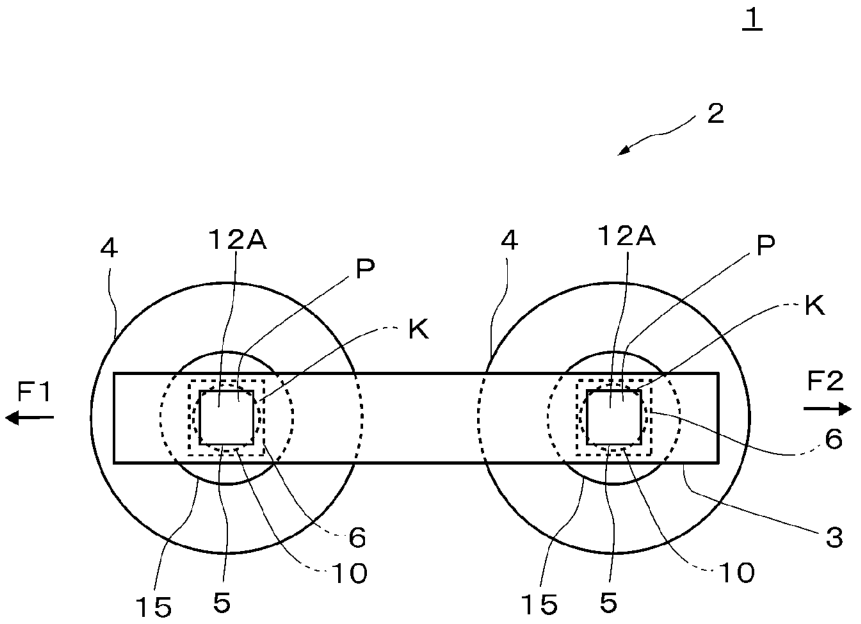
FIG. 4 includes views A and B that are plan views for illustrating an example of through-holes having a different size.
Figure 4:
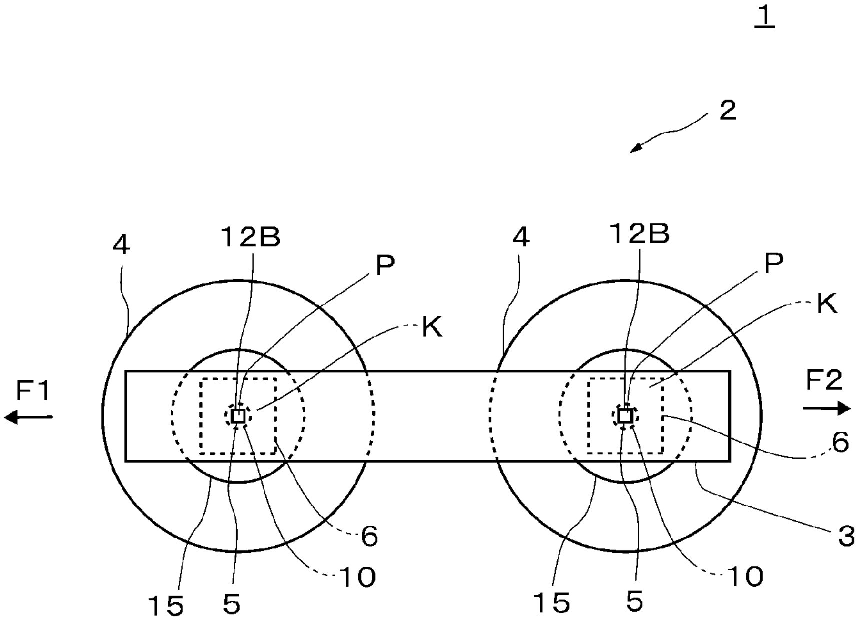

The size of the through-hole 5 is not particularly limited. In the case where the welding step is a step of performing welding using a laser as a heat source (laser welding) as shown in FIG. 3, the through-hole 5 is formed to have such a size that the metal member 9 as described later exposed from the through-hole 5 can be directly irradiated with a laser. FIG. 3 is a view for illustrating a state in which the welding step of joining the conductive member 3 and the terminal 15 of the battery cell 4 is performed by laser welding.

When the welding step is a step of performing laser welding, a larger through-hole 5 makes it possible to directly irradiate the metal member 9 using a laser having a larger beam diameter to form the metal portion 6. This makes it easy to form a joined (welded) part (hereinafter, appropriately referred to as a joining portion 10) between the metal portion 6 and the terminal 15 of the battery cell 4 in a relatively wide range. However, when the size of the through-hole 5 is too large, the joining between the conductive member 3 and the metal portion 6 may be easily broken due to a small joining area in the case where a tensile force is generated in the direction of each of an arrow F1 and F2 with respect to a plurality of battery cells 4 joined to the conductive member 3, as shown in FIG. 4A. In consideration of this point, as illustrated in FIG. 4B, it is also conceivable that the through-hole 5 is a through-hole 12B having a size smaller than the through-hole 12A. However, in the example illustrated in FIG. 4B, a laser having a small beam diameter is used according to the size of the through-hole 5 in order to directly irradiate the metal member 9 with a laser in the welding step, and one joining position is made. For this reason, the portion of the metal member 9 to be melted (dissolved) is limited, and joining between the conductive member 3 and the metal portion 6 may be easily broken. Further, a welding defect may occur. Therefore, the size of the through-hole 5 is preferably set appropriately in consideration of these points. The size of the through-hole 5 is appropriately set according to the size of the battery cell 4 and the like. The through-hole 5, when the size of the through-hole is not limited, is simply collectively referred to as a through-hole 12. The same applies to a case where the number of through-holes formed to one through-hole 5 is not limited to one or two or more as described later.

The joining portion 10 is formed in a shape and a size according to various conditions such as a heat source such as a laser used in the welding step. When the welding step is laser welding, the joining portion 10, seen in a direction from the metal portion 6 toward the terminal 15 of the battery cell 4 (a direction in which the terminal 15 is viewed in plan view), is formed in a region extending outward from the center: a position corresponding to the position irradiated with a laser, as shown in examples of FIGS. 1A and 1B. In examples of FIGS. 1A and 1B, at least a part of the joining portion 10 between the battery cell 4 and the metal portion 6 is formed in an inner region P of the through-hole 5, seen in a direction from the metal portion 6 toward the terminal 15 of the battery cell 4.

In the battery pack 1, the metal portion 6 is provided at least between the conductive member 3 and the terminal 15. The metal portion 6 has electric conductivity, and fixes the conductive member 3 and the battery cell 4 to each other in a state where the conductive member 3 and the battery cell 4 are electrically connected.

As illustrated in FIGS. 1, 3, and the like, the metal portion 6 is formed, for example, by performing a welding step of electrically connecting the conductive member 3 and the terminal 15 of the battery cell 4 using the metal member 9. As an example, in a case where the welding step is laser welding, as shown in FIG. 3, a laser LB is irradiated from a laser irradiation device 17 to the metal member 9 disposed so as to face the terminal 15, whereby joining the conductive member 3 and the terminal 15 of the battery cell 4. At this time, at least a part of the metal member 9 irradiated with the laser LB is melted and then cured again to form the metal portion 6 as illustrated in FIG. 1.

As described later, the metal member 9 refers to a member that relays electrical connection between the conductive member 3 and the terminal 15 of the battery cell 4 in the welding step, and is made of a metal material that forms the metal portion 6. That is, the metal material forming the metal portion 6 is substantially the same as the material of the metal member 9. In addition, unless otherwise specified, the welding step indicates a step of joining the conductive member 3 and the terminal 15 of the battery cell 4 also in the following.

The metal portion 6 is formed of a metal having a melting point lower than that of the metal material forming the conductive member 3 (Hereinafter, it may be referred to as a low melting point metal). Specifically, the melting point of the metal portion 6 is preferably 85° C. or higher and 450° C. or lower. The lower limit value of the preferred melting point of the metal portion 6 is preferably defined according to the relationship between the temperature of the battery cell 4 (hereinafter, sometimes referred to as a battery temperature) and the temperature of the metal portion 6 at the time of using the battery pack 1.

The lower limit value of the melting point of the metal portion 6 is preferably 85° C. from the viewpoint that the metal portion 6 does not melt when the battery pack 1 is used in normal use. The temperature of 85° C. is generally set as the upper limit temperature for use of the battery pack 1 in normal use. When the melting point is lower than 85° C., the metal portion 6 is melted in the normal use region of the battery pack 1, and the electrical connection state between the terminal 15 and the conductive member 3 is released, and there is a possibility that the battery pack 1 cannot be used.

The upper limit value of the melting point of the metal portion 6 is preferably defined according to the relationship between the battery temperature at the time of the welding step and the melting point temperature of the material forming the metal portion 6 (metal material forming the metal member 9).

Figure 5:
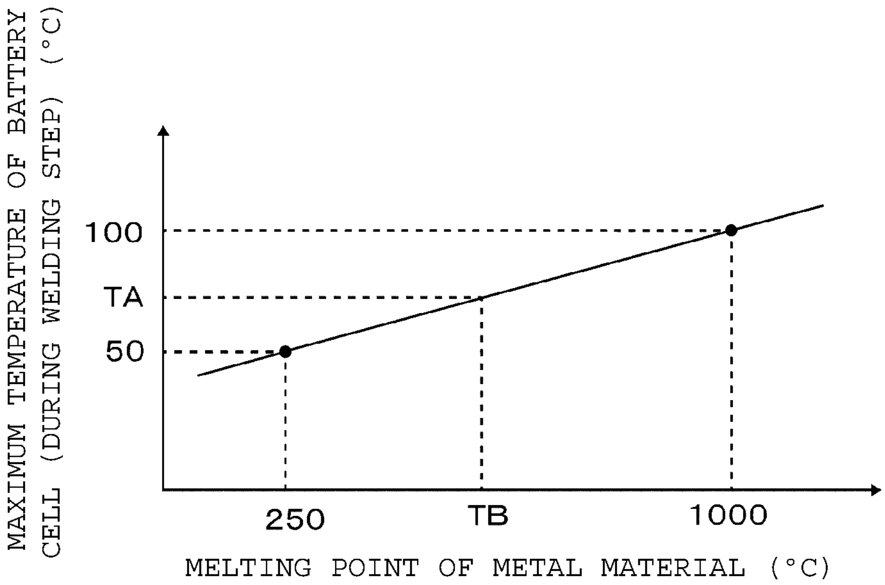
FIG. 5 is a graph showing a relationship between the maximum temperature of a battery cell during a welding step in a battery pack and the melting point of a metal material.

Here, for a general battery pack, the relationship between the maximum temperature of the battery cell at the time of the welding step and the melting point of the metal member is shown by, for example, the graph as shown in FIG. 5. The welding step is, for example, a step of laser-welding the conductive member and the battery cell with a metal member. In the general battery pack described herein, the conductive member is not provided with a through-hole. The maximum temperature of the battery cell indicates the temperature inside the negative electrode terminal.

The relationship between the maximum temperature of the battery during the welding step and the melting point of the metal portion is generally common between the first embodiment and a general battery pack. In FIG. 5, the horizontal axis represents the melting point (° C.) of the metal material of the metal member at the time of the welding step. The vertical axis represents the maximum temperature (° C.) of the battery cell at the time of the welding step. The maximum temperature referred to in FIG. 5 indicates the maximum value of the temperature reached in the welding step. When the maximum temperature of the battery cell is 70° C., it is indicated that the temperature of the battery cell reaches 70° C. at the maximum in the welding step. In the battery cell 4, as described above, the maximum temperature of the battery cell 4 indicates the temperature inside the negative electrode terminal 15B of the battery cell 4 (the inner surface of the negative electrode terminal 15B of a battery can 111). Therefore, when the maximum temperature of the battery cell 4 is 70° C., it is indicated that the internal temperature of the negative electrode terminal 15B of the battery cell 4 reaches 70° C. at the maximum in the welding step.

In the welding step, the higher the melting point of the metal material, the larger the amount of heat required to melt the metal member, and the higher the maximum temperature of the battery cell. As shown in FIG. 5, a linear relationship having a generally positive slope is recognized between the melting point of the metal material and the maximum temperature of the battery cell. When the temperature of the battery cell increases in the welding step, the performance of the battery cell deteriorates in the product manufacturing stage, and thus an allowable maximum temperature during the welding step is defined for the battery cell. In FIG. 5, this allowable maximum temperature is indicated as TA. The value of TA is approximately 70° C. In FIG. 5, the temperature of the metal material when the maximum temperature of the battery cell becomes TA is defined as TB. The value of TB is approximately 450° C. From the viewpoint of suppressing the performance of the battery cell from deteriorating at the product manufacturing stage, it is recognized based on FIG. 5 that when the melting point of the metal material is equal to or lower than TB, the maximum temperature of the battery cell is equal to or lower than TA during the welding step. Since the metal material forms the metal portion, the upper limit value of the melting point of the metal portion is preferably TB (e.g., 450° C.).

Therefore, for the battery pack 1 according to an embodiment, based on the temperature of TB of a general battery pack, the upper limit of the melting point of the metal portion 6 is preferably TB (e.g., the upper limit of the melting point of the metal portion is 450° C.) from the viewpoint of suppressing degradation of the battery cells 4 at the time of manufacturing the battery pack 1 (at the time of the welding step).

Based on the upper limit and lower limit of the melting point of the metal portion 6 as described above, in the battery pack 1 according to the first embodiment, the melting point of the metal portion 6 is preferably 85° C. or higher and 450° C. or lower from the viewpoint of suppressing performance degradation of the battery cell 4 at the time of manufacturing and using the battery pack 1 and from the viewpoint of the ignition risk of the battery cell 4 at the time of using the battery pack 1.

The material of the metal portion 6 is not particularly limited as long as it is a conductive material satisfying the above-mentioned melting point condition, and may be a single metal or an alloy. Preferable examples of the material of the metal portion 6 include a metal material that can be used as a brazing material. The brazing material is melted to penetrate between two base materials (the terminal 15 and the conductive member 3 in the present embodiment), and solidified to join the base materials. Specifically, the metal material that can be used as the brazing material is preferably at least one metal material selected from the group consisting of zinc (Zn) (melting point: 419° C.), indium (In) (melting point: 157° C.), tin (Sn) (melting point: 232° C.), lead (Pb) (melting point: 328° C.), bismuth (Bi) (melting point: 271° C.), and eutectic solder (melting point: 183° C.).

As shown in FIG. 1, the metal portion 6 is not limited to an example formed generally between the conductive member 3 and the battery cell 4. The metal portion 6 preferably has a raised portion 14 as illustrated in FIGS. 2A and 2B. FIGS. 2A and 2B are views illustrating an example of a case where the metal portion 6 has a raised portion 14.

In the examples of FIGS. 2A and 2B, the metal portion 6 includes an intervening portion 13 formed between the conductive member 3 and the terminal 15 of the battery cell 4, and the raised portion 14 raised from the intervening portion 13 in the outward direction (+Z direction) of the through-hole 5 with the upper side (+Z side) of the intervening portion 13 as the starting point and covering at least a part of a peripheral edge portion 5A of the through-hole 5. The outward direction in this case indicates a direction from the terminal 15 toward the metal portion 6 (+Z direction in FIG. 2B).

As illustrated in FIGS. 2A and 2B, the raised portion 14 may cover not only at least a part of the peripheral edge portion 5A of the through-hole 5 but also a part of the surface (outer surface 3A) of the conductive member 3 so as to mount onto the outer surface 3A of the conductive member 3. For example, in the raised portion 14 illustrated in FIGS. 2A and 2B, seen in a direction from the metal portion 6 toward the terminal 15 (−Z direction), a raised tip 14A of the raised portion 14 protrudes outward (+Z side) from the outer surface 3A of the conductive member 3. The surface of the raised portion 14 is inclined downward from the tip 14A toward a predetermined position of the outer surface 3A of the conductive member 3. Thus, the raised portion 14 covers the outer surface 3A of the conductive member 3 up to the predetermined position on the outer surface 3A. Such a raised portion 14 can be formed, for example, by forming a state in which the metal material overflows from the through-hole 5 when the metal member 9 is melted in the welding step, and solidifying the metal material while maintaining the state. Since the metal portion 6 has the raised portion 14, it is easy to maintain the joining between the conductive member 3 and the battery cell 4 when a tensile force is applied to the plurality of battery cells 4 joined to the conductive member 3 in a direction away from each other. Note that FIGS. 2A and 2B do not limit the shape of the raised portion 14. The shape of the raised portion 14 can be formed in a shape corresponding to the state in which the metal member 9 is melted in the welding step.

The battery cell 4 has a terminal 15. The battery cell 4 is usually provided with a positive electrode terminal 15A and a negative electrode terminal 15B as the terminals 15. The positive electrode terminal 15A and the negative electrode terminal 15B of the battery cell 4 are simply referred to as the terminal 15 unless the positive electrode and the negative electrode are particularly distinguished.

The type of the battery cell 4 is not particularly limited, and may be a primary battery or a secondary battery. As the secondary battery, for example, a lithium ion secondary battery, a lithium ion polymer secondary battery, or the like can be adopted. However, this does not exclude that the battery cell 4 is another battery.

In the description of the first embodiment, a case where the battery cell 4 is a cylindrical lithium ion battery 104 will be described as an example.

Figure 6:
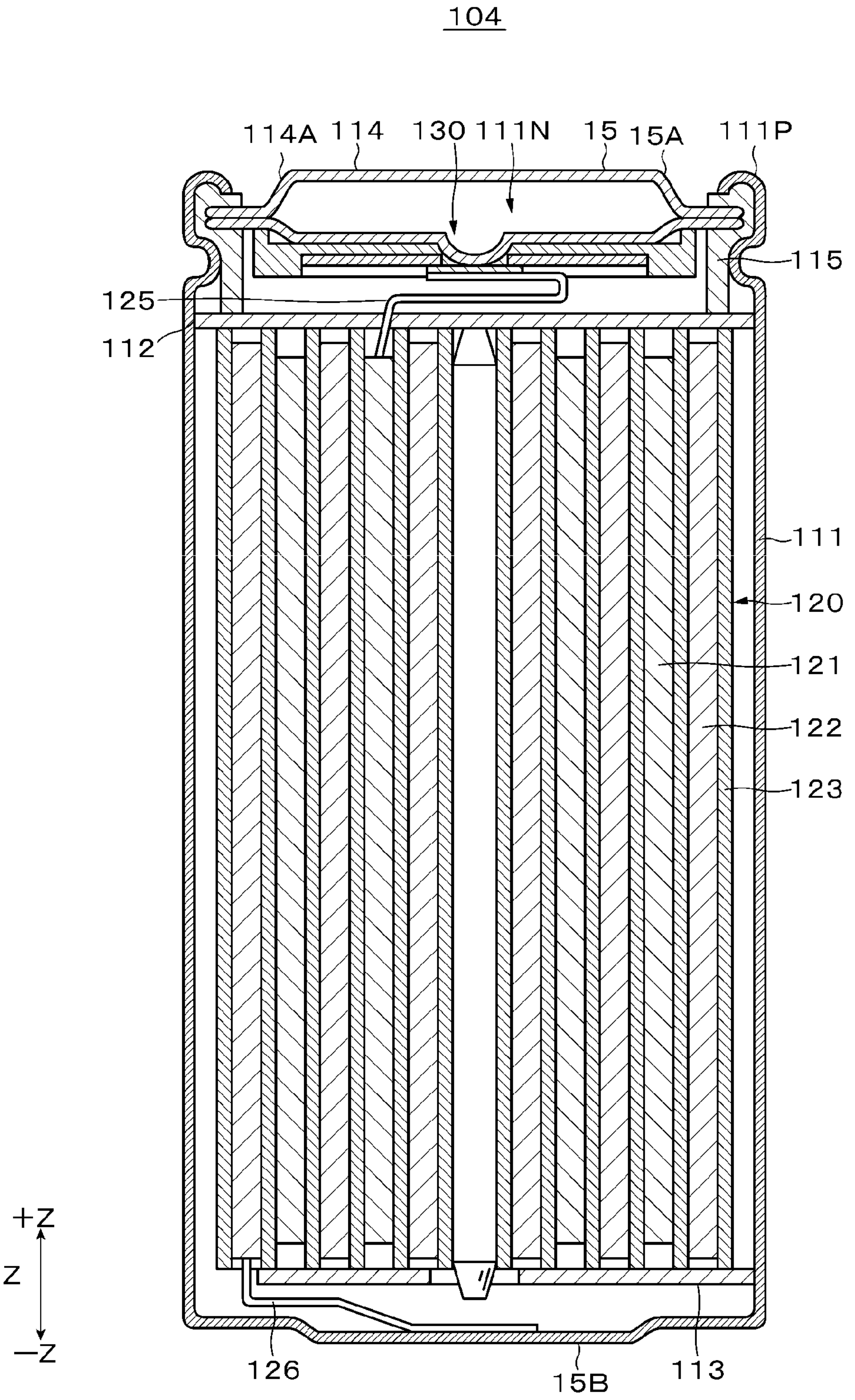
FIG. 6 is a sectional view illustrating an example of a battery cell.

The overall configuration of the lithium ion battery 104 will be described. The lithium ion battery 104 can be used as a secondary battery, and one configured as shown in FIG. 6 can be exemplified. FIG. 6 is a schematic sectional view of the lithium ion battery 104. The lithium ion battery 104 is, for example, a cylindrical lithium ion battery 104 in which an electrode winding body 120 is housed inside a battery can 111 as shown in FIG. 6.

Specifically, the lithium ion battery 104 includes, for example, a pair of insulating plates 112 and 113 and the electrode winding body 120 inside the cylindrical battery can 111. However, the lithium ion battery 104 may further include, for example, one or two or more of a positive temperature coefficient (PTC) element, a reinforcing member, and the like inside the battery can 111.

A battery cover 114 is a member that closes an open end surface 111N of the battery can 111 mainly in a state in which the electrode winding body 120 and the like are housed inside the battery can 111. The battery cover 114 contains, for example, the same material as the material that forms the battery can 111. The central region of the battery cover 114 protrudes, for example, in +Z direction. This protruding portion may be referred to as a protruding portion 114A.

A gasket 115 is mainly a member that is interposed between the battery can 111 (bent portion 111P) and the battery cover 114 and seals the gap between the bent portion 111P and the battery cover 114. However, the surface of the gasket 115 may be coated with asphalt or the like, for example.

The gasket 115 preferably contains an insulating material. The type of insulating material is not particularly limited, and is, for example, a polymeric material such as polybutylene terephthalate (PBT) and polypropylene (PP). In this case, the gasket 115 can seal the gap between the bent portion 111P and the battery cover 114 while electrically separating the battery can 111 and the battery cover 114 from each other.

Mainly in a case where the pressure inside the battery can 111 (internal pressure) increases, a safety valve mechanism 130 releases the internal pressure by releasing the sealed state of the battery can 111 as necessary. The cause of an increase in the internal pressure of the battery can 111 is, for example, a gas generated due to a decomposition reaction of an electrolytic solution during charge and discharge. As a specific configuration of the safety valve mechanism 130, a known configuration (for example, the configuration described in WO 2018/042777 A) can be adopted.

In the cylindrical lithium ion battery 104, the electrode winding body 120 is formed by spirally winding a strip-shaped positive electrode 121 and a strip-shaped negative electrode 122 with a separator 123 interposed therebetween, and is accommodated in the battery can 111 in a state of being impregnated with an electrolytic solution. The positive electrode 121 is obtained by forming a positive electrode active material layer on one surface or both surfaces of a positive electrode foil, and the material of the positive electrode foil is, for example, a metal foil made of aluminum or an aluminum alloy. The negative electrode 122 is obtained by forming a negative electrode active material layer on one surface or both surfaces of a negative electrode foil, and the material of the negative electrode foil is, for example, a metal foil made of nickel, a nickel alloy, copper, or a copper alloy. The separator 123 is a porous and insulating film, and enables movement of substances such as ions and an electrolytic solution while electrically insulating the positive electrode 121 and the negative electrode 122.

The positive electrode active material layer formed in the positive electrode 121 contains at least a positive electrode material (positive electrode active material) capable of occluding and releasing lithium, and may further contain a positive electrode binder, a positive electrode conductive agent, and the like. The positive electrode material is preferably a lithium-containing composite oxide or a lithium-containing phosphate compound. The lithium-containing composite oxide has, for example, a layered rock salt-type or spinel-type crystal structure. The lithium-containing phosphate compound has, for example, an olivine type crystal structure.

The positive electrode binder contains a synthetic rubber or a polymer compound. Examples of the synthetic rubber include a styrene-butadiene-based rubber, a fluorine-based rubber, and ethylene propylene diene. The polymer compound includes polyvinylidene fluoride (PVdF), polyimide, and the like.

The positive electrode conductive agent is a carbon material such as graphite, carbon black, acetylene black, or Ketjen black. However, the positive electrode conductive agent may be a metal material and a conductive polymer.

The surface of the negative electrode foil is preferably roughened for improving adhesion to the negative electrode active material layer. The negative electrode active material layer contains at least a negative electrode material (negative electrode active material) capable of occluding and releasing lithium, and may further contain a negative electrode binder, a negative electrode conductive agent, and the like.

The negative electrode material contains, for example, a carbon material. The carbon material is easily graphitizable carbon, non-graphitizable carbon, graphite, low crystalline carbon, or amorphous carbon. The shape of the carbon material is fibrous, spherical, granular, or scaly.

The negative electrode material contains, for example, a metal-based material. Examples of the metal-based material include Li (lithium), Si (silicon), Sn (tin), Al (aluminum), Zr (zinc), and Ti (titanium). The metal-based element forms a compound, a mixture, or an alloy with another element, and examples thereof include silicon oxide ($SiO_x$ ($0<x\leq2$)), silicon carbide (SiC), an alloy of carbon and silicon, and lithium titanate (LTO).

The separator 123 is a porous membrane containing a resin, and may be a laminated film of two or more porous films. The resin may be a polypropylene and a polyethylene. The separator 123 may include a resin layer on one or both of the surfaces of the porous membrane as a substrate layer. This is because adhesion of the separator 123 to each of the positive electrode 121 and the negative electrode 122 is improved, thus keeping the electrode winding body 120 from warping.

The resin layer contains a resin such as PVdF. When the resin layer is formed, the substrate layer is coated with a solution prepared by dissolving the resin in an organic solvent, and thereafter, the substrate layer is dried. Alternatively, the substrate layer may be immersed in the solution, and thereafter the substrate layer may be dried. The resin layer preferably contains an inorganic particle or an organic particle in terms of enhancing heat resistance and safety of the battery. Examples of the type of the inorganic particle include aluminum oxide, aluminum nitride, aluminum hydroxide, magnesium hydroxide, boehmite, talc, silica, and mica. In place of the resin layer, a surface layer formed by a sputtering method, an ALD (atomic layer deposition) method, and other methods and mainly composed of an inorganic particle may be used.

The electrolytic solution includes a solvent and an electrolyte salt, and may further include an additive and the like. The solvent is a nonaqueous solvent such as an organic solvent or water. An electrolytic solution containing a nonaqueous solvent is referred to as a nonaqueous electrolytic solution. The nonaqueous solvent is a cyclic carbonate ester, a chain carbonate ester, lactone, a chain carboxylic ester, or nitrile (mononitrile).

Although the representative example of the electrolyte salt is a lithium salt, a salt other than the lithium salt may be contained. Examples of the lithium salt include lithium hexafluorophosphate ($LiPF_6$), lithium tetrafluoroborate ($LiBF_4$), lithium perchlorate ($LiClO_4$), lithium methanesulfonate ($LiCH_3SO_3$), lithium trifluoromethanesulfonate ($LiCF_3SO_3$), and dilithium hexafluorosilicate ($Li_2SF_6$).

The positive electrode terminal 15A of the battery cell 4 is electrically connected to the positive electrode 121 of the electrode winding body 120. The negative electrode terminal 15B is electrically connected to the negative electrode 122 of the electrode winding body 120. As described above, the protruding portion 114A protruding in the outward direction (+Z axis direction in the example of FIG. 6) is formed in the central region of the battery cover 114. The protruding portion 114A is electrically connected to the positive electrode 121 of the electrode winding body 120 with a positive electrode tab 125 formed of aluminum or the like, and forms the terminal 15 (the positive electrode terminal 15A in the example of FIG. 6) of the battery cell 4. The negative electrode 122 of the electrode winding body 120 is electrically connected to the bottom surface side facing the battery cover 114 in the battery can 111 with a negative electrode tab 126 formed of nickel or the like. When such a lithium ion battery 104 shown in the example of FIG. 6 is used as the battery cell 4 in the battery pack 1 shown in FIG. 1, the positive electrode terminal 15A of the battery cell 4 is in a state of being joined to the conductive member 3 via the metal portion 6.

However, it is not excluded that the structures of the positive electrode 121 and the negative electrode 122 are reversed. That is, the protruding portion 114A may be electrically connected to the negative electrode 122 of the electrode winding body 120, and the positive electrode 121 of the electrode winding body 120 may be electrically connected to the bottom surface side facing the battery cover 114 in the battery can 111. The example in which the lithium ion battery 104 in this case is used as the battery cell 4 in the battery pack 1 shown in FIG. 1 shows a state in which the negative electrode terminal 15B of the battery cell 4 is joined to the conductive member 3 via the metal portion 6.

Figure 7:
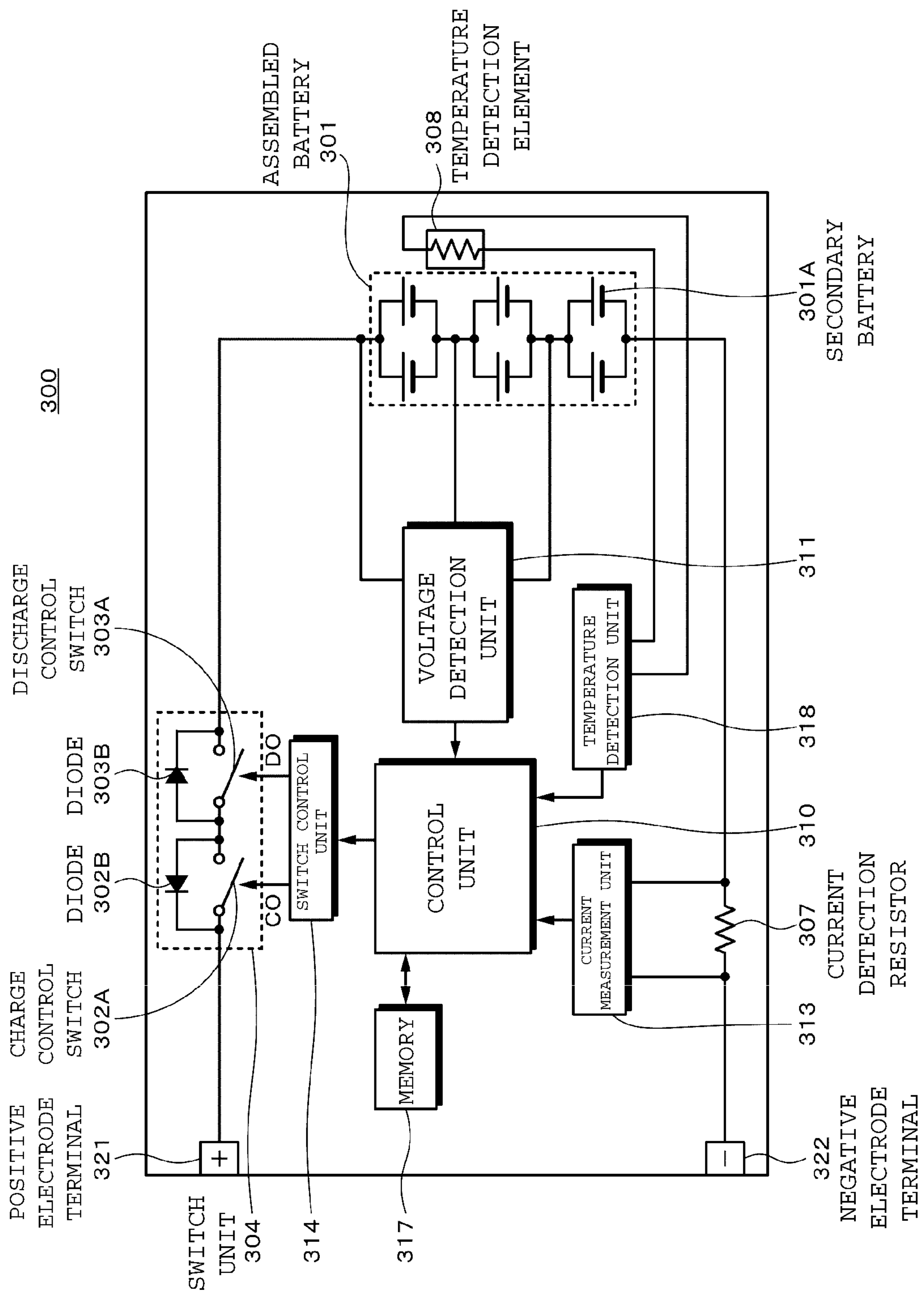
FIG. 7 is a diagram illustrating a circuit configuration example of a battery pack according to an embodiment.
Figure 8:
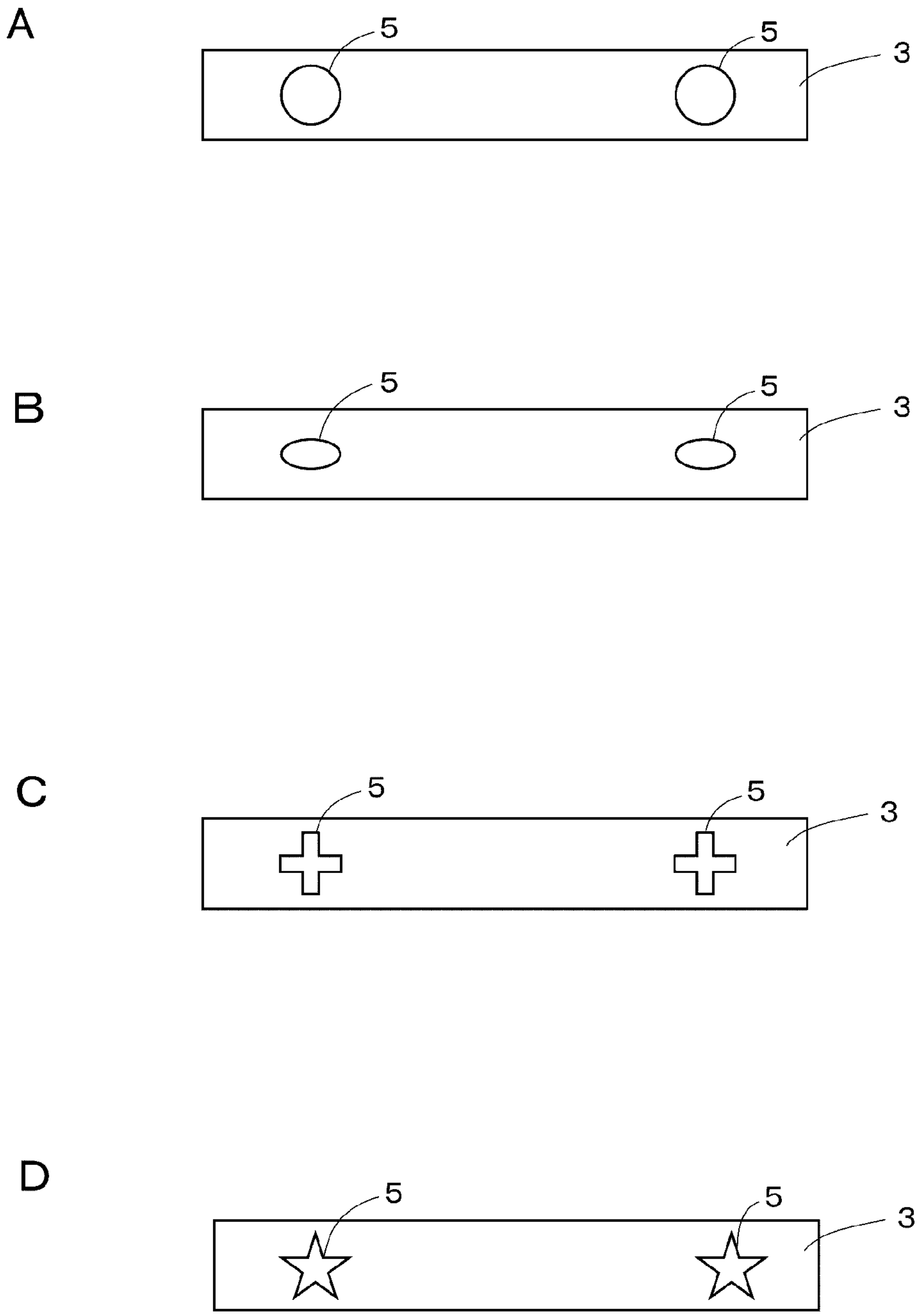
FIG. 8 includes views A to D that are plan views illustrating modifications of a battery pack according to an embodiment.
Figure 9:
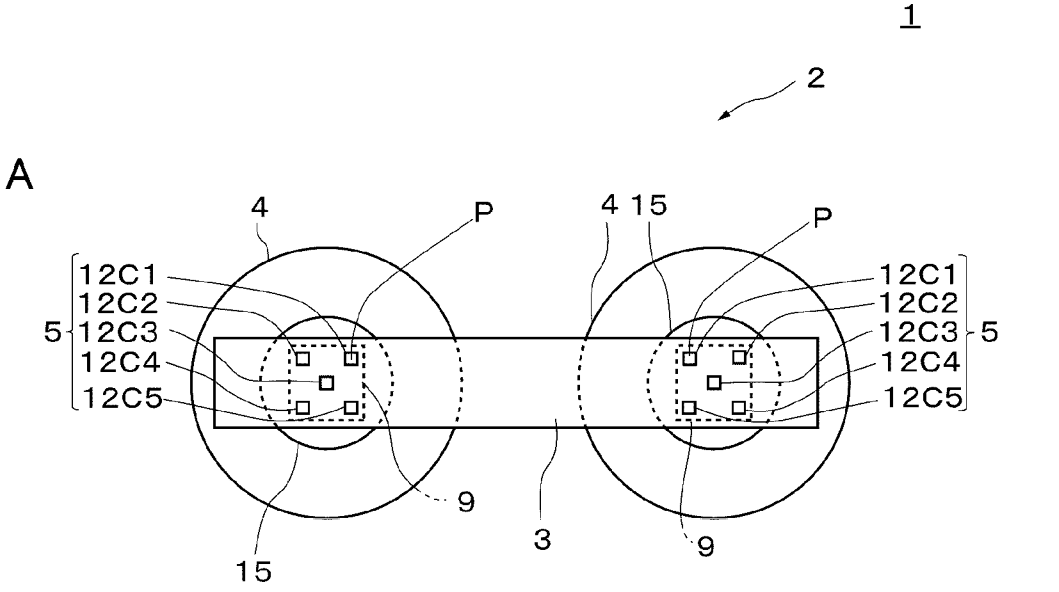
FIG. 9 includes views A and B that are plan views for illustrating an example of a battery pack according to an embodiment.
Figure 9:
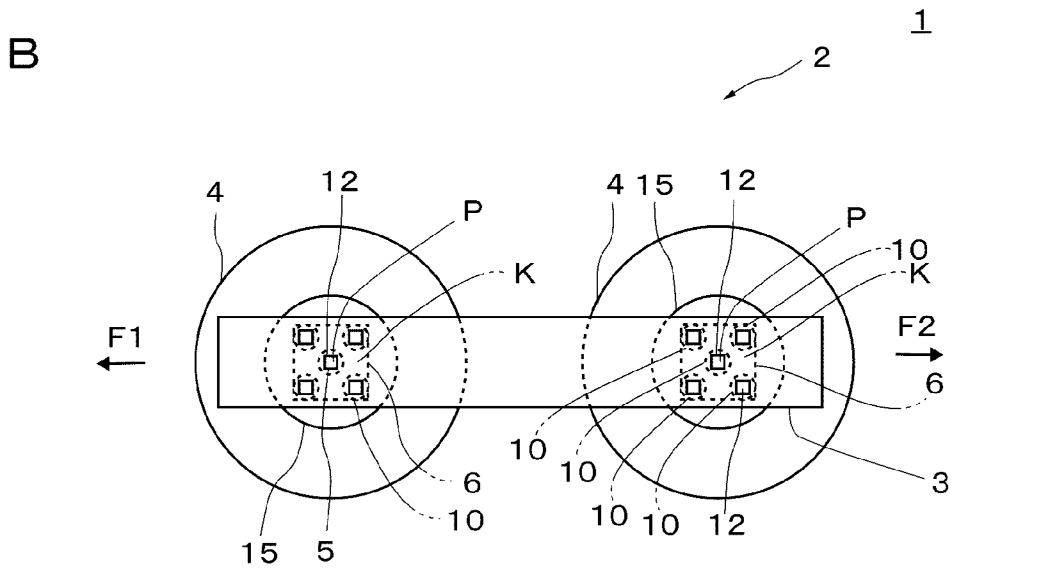

The battery pack 1 according to an embodiment may include only the assembled battery structure 2 described above, or may include a configuration other than the assembled battery structure 2 such as a control circuit as illustrated in FIG. 7. FIG. 7 is a block diagram illustrating a circuit configuration example of the battery pack 1 (battery pack 300) according to an embodiment when the battery pack 1 is the battery pack 300 including a configuration other than the assembled battery structure 2.

The battery pack 300 includes an assembled battery 301, a switch unit 304 including a charge control switch 302A and a discharge control switch 303A, a current detection resistor 307, a temperature detection element 308, and a control unit 310. In the example of FIG. 7, the assembled battery 301 has a configuration having the above-described assembled battery structure 2.

In the battery pack 300, the control unit 310 can control each device, further perform charge and discharge control at the time of abnormal heat generation, and calculate and correct the remaining capacity of the battery pack 300. A positive electrode terminal 321 and a negative electrode terminal 322 of the battery pack 300 are connected to a charger or an electronic device, and thereby charging and discharging are performed.

The assembled battery 301 is formed by connecting a plurality of secondary batteries 301A to each other in series and/or in parallel. FIG. 7 illustrates an example in the case of connecting six secondary batteries 301A in two parallel and three series (2P3S). In the assembled battery 301, a set of two secondary batteries 301A arranged in parallel forms the above-described assembled battery structure 2, and three sets of such assembled battery structures 2 are formed. These three sets of assembled battery structures 2 are connected in series.

A temperature detection unit 318 is connected to the temperature detection element 308 (for example, a thermistor), measures the temperature of the assembled battery 301 or the battery pack 300, and provides the measured temperature to the control unit 310. A voltage detection unit 311 measures the voltages of the assembled battery 301 and each of the secondary batteries 301A included therein, performs A/D conversion of the measured voltage, and provide the measured voltage to the control unit 310. A current measurement unit 313 measures the current by using the current detection resistor 307 and provides this measured current to the control unit 310.

A switch control unit 314 controls the charge control switch 302A and the discharge control switch 303A of the switch unit 304 based on the voltage and the current input from the voltage detection unit 311 and the current measurement unit 313. The switch control unit 314 sends a turn off control signal to the switch unit 304, thereby preventing overcharge or over-discharge, when the secondary battery 301A has a voltage equal to or higher than an overcharge detection voltage (e.g., 4.20 V±0.05 V) or equal to or lower than an over-discharge detection voltage (2.4 V±0.1 V).

After the charge control switch 302A or the discharge control switch 303A is turned off, charging or discharging can be performed only through a diode 302B or a diode 303B. As these charge/discharge switches, a semiconductor switch such as a MOSFET can be used. The switch unit 304 is provided on the positive side in FIG. 7 but may be provided on the negative side.

A memory 317 includes a RAM or a ROM, stores values of battery characteristics calculated by the control unit 310, a full charge capacity, a remaining capacity, and the like, and the stored information is appropriately rewritten.

In the battery pack 1, the metal portion 6 is provided between the conductive member 3 and the terminal 15 of the battery cell 4. The metal portion 6 is formed by melting the metal member 9 for joining the battery cell 4 and the conductive member 3 in a welding step when the battery pack 1 is manufactured.

In the battery pack 1, the metal portion 6 has a melting point of 85° C. or higher and 450° C. or lower, and is formed of a metal material having a melting point lower than that of a metal forming the conductive member 3. Therefore, the amount of heat required for melting the metal member 9 in the welding step in manufacturing the battery pack 1 is suppressed. Thus, the battery pack 1 can suppress thermal damage to the battery cells 4 during the welding step.

In a conventional battery pack having a conductive member not provided with a through-hole 5, when a metal portion is formed between the conductive member and the terminal in the welding step, a large amount of heat is required to melt the metal member for forming the metal portion. For example, in a case where the welding step is laser welding, the metal member is irradiated with a laser via the conductive member. Therefore, in a case where the material of the conductive member is copper and the terminal of the battery cell is formed of iron, the output required for laser irradiation is about 500 W. In this case, in the welding step, the temperature of the battery cell rises to 80° C. to around 100° C., and thermal damage to the battery cell 4 becomes remarkable.

On the other hand, as shown in an embodiment, in the case of the battery pack 1 in which the metal portion 6 is provided between the conductive member 3 and the terminal 15 using the conductive member 3 provided with the through-hole 5 and the metal portion 6 is exposed from the through-hole 5, it is easy to adopt a configuration in which the metal member 9 for forming the metal portion 6 is exposed from the through-hole 5 at the time of the welding step. Therefore, it is possible to directly irradiate the metal member 9 with a laser during the welding step. Therefore, the battery pack 1 according to an embodiment makes it easy to realize a welding step when the output required for laser irradiation is about 50 W (about 1/10) under the condition of using the same material as that of the conventional battery pack described above, that is, under the condition where the material of the conductive member 3 is copper and the terminal of the battery cell 4 is formed of iron. In this case, it is easy to suppress the temperature of the battery cell 4 to about 40° C. to 50° C. Therefore, in the battery pack 1 according to an embodiment, the amount of heat applied to the battery cells 4 from the heat source used in the welding step can be suppressed, and thermal damage to the battery cells 4 can be suppressed.

As described above, in the welding step when the battery pack 1 is manufactured, the region of the metal member 9 irradiated with a laser can be easily exposed to the inner region P of the through-hole 5, so that the position of the metal member 9 can be confirmed from the outside of the through-hole 5.

The battery pack 1 according to an embodiment is not limited to the example illustrated in FIG. 1, and may be configured as illustrated in the following modifications.

In the battery pack 1 according to an embodiment, the shape of the through-hole 5 is not limited to a rectangular shape. FIGS. 8A to 8D are plan views illustrating modifications of the through-hole 5 formed in conductive member 3. For example, as illustrated in FIGS. 8A to 8D, the shape of the through-hole 5 may be a circular shape (FIG. 8A), an elliptical shape (FIG. 8B), a cross shape (FIG. 8C), a star shape (FIG. 8D), or the like.

The battery pack 1 can be modified suitable and also obtain the same effects as those described herein.

The present application is described below in further detail according to another embodiment, where the same or similar configurations in the above description are denoted by the same reference numerals, and redundant description is appropriately omitted. In addition, unless otherwise specified, the matters described above can be applied to another embodiment relating to having a plurality of through-holes 12 spaced apart from each other with respect to one battery cell.

FIGS. 9A and 9B are plan views for illustrating the main parts of an example of the battery pack 1 according to the an embodiment. FIG. 9A illustrates a state before the welding step is performed, and FIG. 9B illustrates a state after the welding step is performed. In the battery pack 1 according to an embodiment, the through-hole 5 described is constituted by a plurality of through-holes 12, and each of the plurality of through-holes 12 exposes at least a part of the metal portion 6.

The battery pack 1 illustrated in the examples of FIGS. 9A and 9B according to an embodiment includes five through-holes 12C1, 12C2, 12C3, 12C4, and 12C5 as the plurality of through-holes 12 corresponding to one battery cell 4. The five through-holes 12C1, 12C2, 12C3, 12C4, and 12C5 are arranged in a state of being separated from each other (dispersed state). In the example of FIG. 9A, regarding the layout of the five through-holes 12C1, 12C2, 12C3, 12C4, and 12C5, one through-hole 12C1 is formed at a position corresponding to the vicinity of the center of the metal member 9, and the through-holes 12C2, 12C3, 12C4, and 12C5 are provided at predetermined positions toward each of the four corner positions of the metal member 9 from the position where the through-hole 12C1 is formed.

When the through-hole 5 is formed as the plurality of through-holes 12 as described above, a laser having a beam diameter smaller than that of a laser used in the battery pack 1 according to an embodiment as illustrated in FIG. 1 is used in the welding step, and the metal member 9 is melted at the positions corresponding to each of the through-holes 12. Specifically, in the example of FIG. 9A, the metal member 9 is melted at five positions, i.e., one position in the vicinity of the center position of the metal member 9 and four positions in the vicinity of each of the corner positions of the metal member 9, and the metal member 9 is uniformly melted at both the portion in the vicinity of the center and the portions in the vicinity of the corners. In this case, as shown in FIG. 9B, the joining portion 10 between the metal portion 6 and the terminal 15 of the battery cell 4 is more reliably formed also in the vicinity of the center position of the metal portion 6 and in the vicinity of the peripheral edge position of the metal portion 6. The joining strength between the metal portion 6 and the battery cell 4 can be roughly equalized in the vicinity of the center and the peripheral edge position of the metal portion 6.

In addition, the battery pack 1 according to an embodiment has a joining area larger than that of one large through-hole 12 as shown in FIG. 1, and thereby easily strengthen the joining force between the conductive member 3 and the metal portion 6. Therefore, when a tensile force is generated in the directions of each of the arrows F1 and F2 as shown in FIG. 9B with respect to the plurality of battery cells 4 joined to the conductive member 3, the joining state between the conductive member 3 and the battery cells 4 can be easily firmly maintained. In the examples of FIGS. 9A and 9B, the through-holes 12 (12C1 to 12C5), the metal member 9, and the metal portion 6 are formed in a substantially rectangular shape, but this is an example of the through-hole 12, the metal member 9, and the metal portion 6.

According to the battery pack 1 of an embodiment, the same effects as those described herein and relating to other embodiments can be obtained. In addition, it is easy to more uniformly melt the metal member 9 in the welding step.

Figure 10:
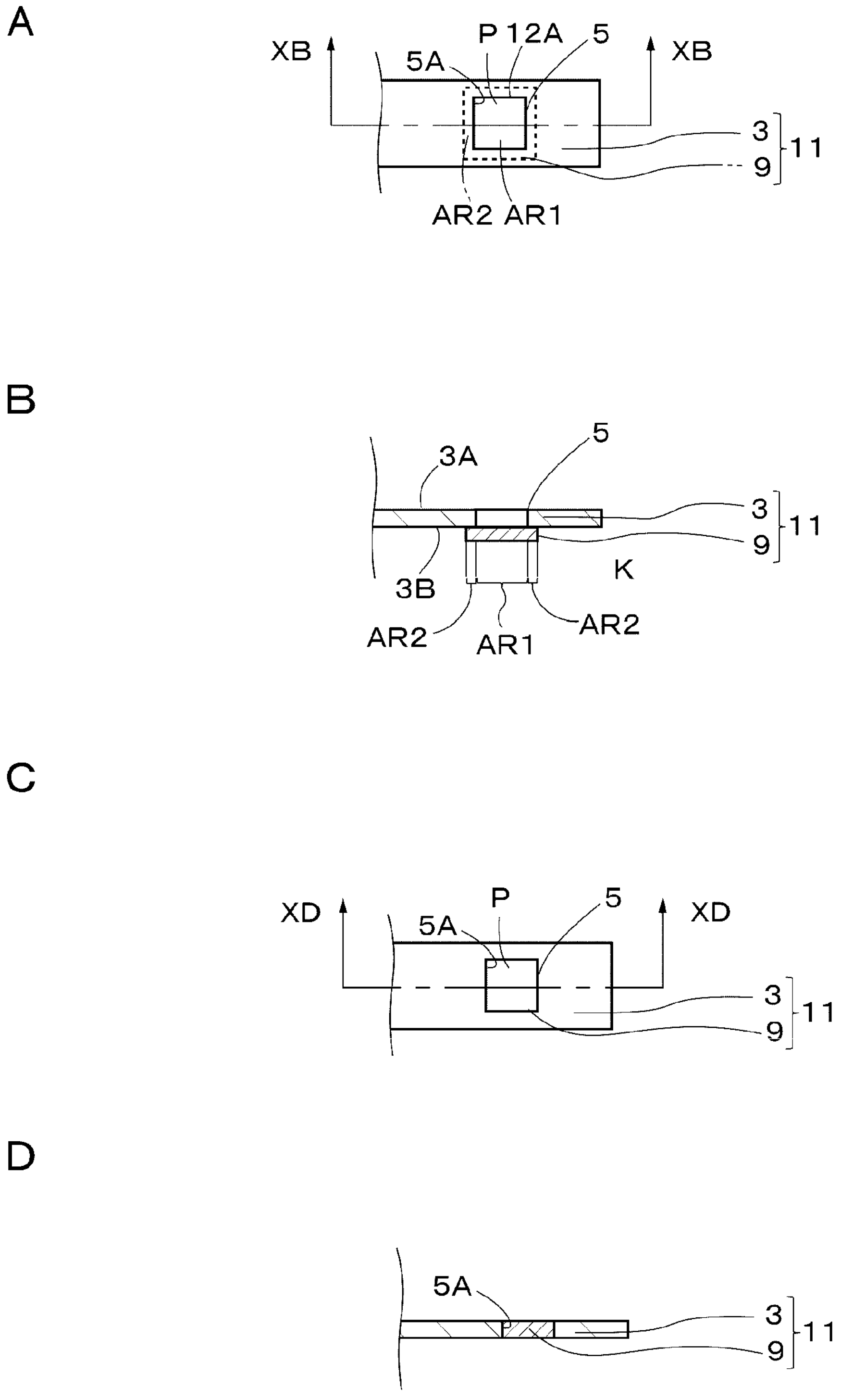
FIG. 10, view A is a plan view for illustrating an example of a composite member.
Figure 11:
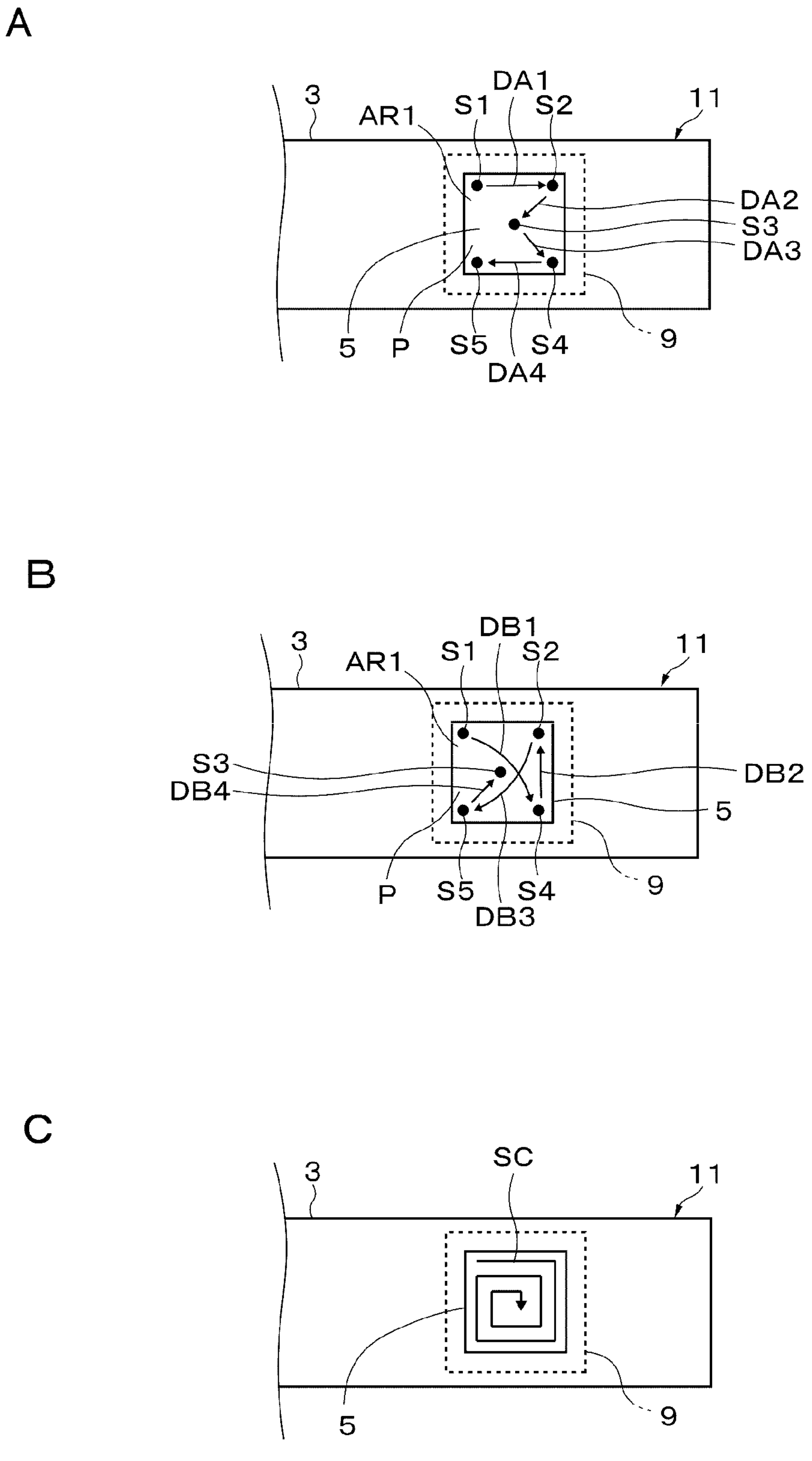
FIG. 11 includes views A to C which are plan views for illustrating a welding step in a manufacturing process of a battery pack.

Next, the method for manufacturing the battery pack 1 will be described. Hereinafter, the case where the battery pack 1 according to an embodiment is formed of the assembled battery structure 2 and is formed as shown in FIG. 1 will be described as an example with reference to FIGS. 10 and 11 in addition to FIG. 3. FIGS. 10 and 11 are views for illustrating an example of the welding step in the manufacturing process of the battery pack 1.

The method for manufacturing the battery pack 1 includes the following first step and second step.

The first step is a step of preparing for performing the second step. In the first step, a composite member obtained in the step of forming a composite member described below is positioned.

As illustrated in FIGS. 10A and 10B, the metal member 9 is attached to the conductive member 3 having the through-hole 5. As a result, a composite member 11 in which the metal member 9 is fixed to the conductive member 3 is formed. FIGS. 10A and 10B are views illustrating an example of the composite member 11. In the examples of FIGS. 10A and 10B, the metal member 9 is disposed on one surface (inner surface 3B) side of the conductive member 3, and the inner region P of the through-hole 5 is closed with the metal member 9. The through-hole 5 corresponding to one battery cell 4 is constituted by one rectangular through-hole 12A, and a part of the metal member 9 is exposed from the through-hole 12A in the state of the composite member 11. Note that this exposed region is referred to as an exposed region AR1. In the examples of FIGS. 10A and 10B, the exposed region AR1 is a rectangular region corresponding to the rectangular through-hole 12A forming the through-hole 5.

In the composite member 11, a region of the metal member 9 outside the exposed region AR1 (non-exposed region AR2) is a region overlapping the conductive member 3, and the metal member 9 is fixed to the conductive member 3 in the non-exposed region AR2. The method for fixing the metal member 9 and the conductive member 3 in this case is not limited. In the composite member 11, the fixing strength between the metal member 9 and the conductive member 3 is not particularly limited, and may be a fixing strength of a so-called temporary fixing level. The metal member 9 is a member for forming the metal portion 6, and forms the metal portion 6 by the welding step as described above. The material of the metal member 9 is common to the material of the metal portion 6.

In the first step, as shown in FIG. 3, positioning for determining the position (welding position) of the terminal 15 of the battery cell 4 and the position (welding position) of the composite member 11 is performed. In the positioning, the positions of the composite member 11 and the terminal 15 are determined such that the position of the metal member 9 of the composite member 11 faces the position of the terminal 15 of the battery cell 4. The position of the inner region P of the through-hole 5 is a position corresponding to the terminal 15 of the battery cell 4 with the metal member 9 interposed therebetween.

Next, the second step is performed. The second step is a welding step of joining the conductive member 3 and the battery cell 4 to each other. In the second step, the metal portion 6 is formed between the conductive member 3 and the battery cell 4. The joining portion 10 for joining the battery cell 4 and the metal portion 6 is also formed. Hereinafter, a case where the second step is laser welding using a laser as a heat source will be described as an example.

After the positioning is performed, as shown in FIG. 3, a laser LB is irradiated from the outside of the composite member 11 toward the exposed region AR1 of the metal member 9 exposed to the inner region P of the through-hole 5 from a laser irradiation device 17. As the laser LB, a laser generally used in laser welding such as a YAG laser, a fiber laser, or a green laser can be appropriately used.

The irradiation position of the laser LB may be one position, but as shown in FIGS. 11A and 11B, it is preferable that the laser LB is irradiated to a plurality of positions. FIGS. 11A and 11B are views for illustrating an example of a laser irradiation position. In the examples of FIGS. 11A and 11B, spot welding is used as the laser irradiation method, and the laser is dispersedly irradiated to the five positions S1, S2, S3, S4, and S5 in the exposed region AR1.

When spot welding is performed at a plurality of positions in the exposed region, the laser irradiation order is not particularly limited. For example, as shown in FIG. 11A, the laser may be sequentially irradiated in the order of a position S1, a position S2, a position S3, a position S4, and a position S5. In FIG. 11A, arrows DA1, DA2, DA3, and DA4 are arrows for specifying the irradiation order. That is, the position S1 is first irradiated with the laser, and then the position S2 indicated by the tip of the arrow DA1 is irradiated with the laser. Then, the laser is sequentially irradiated in the order of the position S3 indicated by the tip of the arrow DA2, then the position S4 indicated by the tip of the arrow DA3, and lastly the position S5 indicated by the tip of the arrow DA4.

However, from the viewpoint of more equalizing the melting of the metal member 9, the irradiation order of the laser LB is preferably the position S1, the position S4, the position S2, the position S5, and the position S3 in order as illustrated in FIG. 11B. In FIG. 11B, arrows DB1, DB2, DB3, and DB4 are arrows for specifying the irradiation order. First, the position S1 is irradiated with a laser, and then the position S4 indicated by the tip of the arrow DB1 is irradiated with a laser. That is, the laser is sequentially irradiated to two positions (the positions S1 and S4) arranged on one diagonal line among the four corners of the rectangular exposed region AR1. Furthermore, the position S2 indicated by the tip of the arrow DB2 is irradiated with a laser, and then the position S5 indicated by the tip of the arrow DB3 is irradiated with a laser. That is, the laser is sequentially irradiated to two positions (the positions S2 and S5) arranged on the other diagonal line of the exposed region AR1. Lastly, the laser is irradiated to the position S3 indicated by the tip of the arrow DB2. That is, the laser is irradiated to the center position (the position S3) of the exposed region AR1. When the irradiation order as shown in FIG. 11B is used, the melted state of the metal member 9 is easily realized more uniformly over the entire metal member 9 including not only the center of the exposed region AR1 but also the outside of the exposed region AR1, and a state in which the metal portion 6 and the battery cell 4 are electrically connected can be formed more firmly.

In the laser welding, the metal member 9 receives heat to an extent exceeding the melting point by being irradiated with a laser, and the metal member 9 is brought into a molten state. Thereafter, the metal material forming the metal member 9 solidifies at a temperature equal to or lower than the melting point. At this time, the conductive member 3 and the terminal 15 are joined via the metal material forming the metal member 9, and the metal portion 6 is formed of the metal material forming the metal member 9. That is, the conductive member 3 and the terminal 15 of the battery cell 4 are fixed (welded) to each other in a state being electrically connected via the metal portion 6. Thus, the battery pack 1 is obtained.

When the metal member 9 is melted, at least a part of the metal material forming the metal member 9 covers the peripheral edge portion 5A of the through-hole 5 and overflows from the peripheral edge portion 5A according to the molten state of the metal member 9, and the metal material may be solidified in this state. In this case, the raised portion 14 is formed in the metal portion 6.

When the battery pack 1 has another configuration of the assembled battery structure 2, the method for manufacturing the battery pack 1 is not particularly limited for steps other than the welding step.

According to the method for manufacturing the battery pack 1 described above, since a laser is directly irradiated toward the exposed region AR1 of the metal member 9, which is exposed from the through-hole 5 of the conductive member 3, the amount of heat applied to the battery cell 4 in the welding step can be reduced, and thermal damage can be suppressed.

Next, modifications of the method for manufacturing the battery pack 1 will be described in detail according to an embodiment.

In the method for manufacturing the battery pack 1, the composite member 11 is not limited to the examples of FIGS. 10A and 10B. As illustrated in FIGS. 10C and 10D, the composite member 11 may have a structure in which the metal member 9 is fitted into the through-hole 5. FIGS. 10C and 10D are views showing another example of the composite member 11. In this case, the end surface (outer peripheral end surface) of the metal member 9 is connected to the peripheral edge portion 5A of the through-hole 5, and whereby the composite member 11 is formed. In the composite member 11, the end surface of the metal member 9 covers the peripheral edge portion 5A of the through-hole 5.

Figure 12:
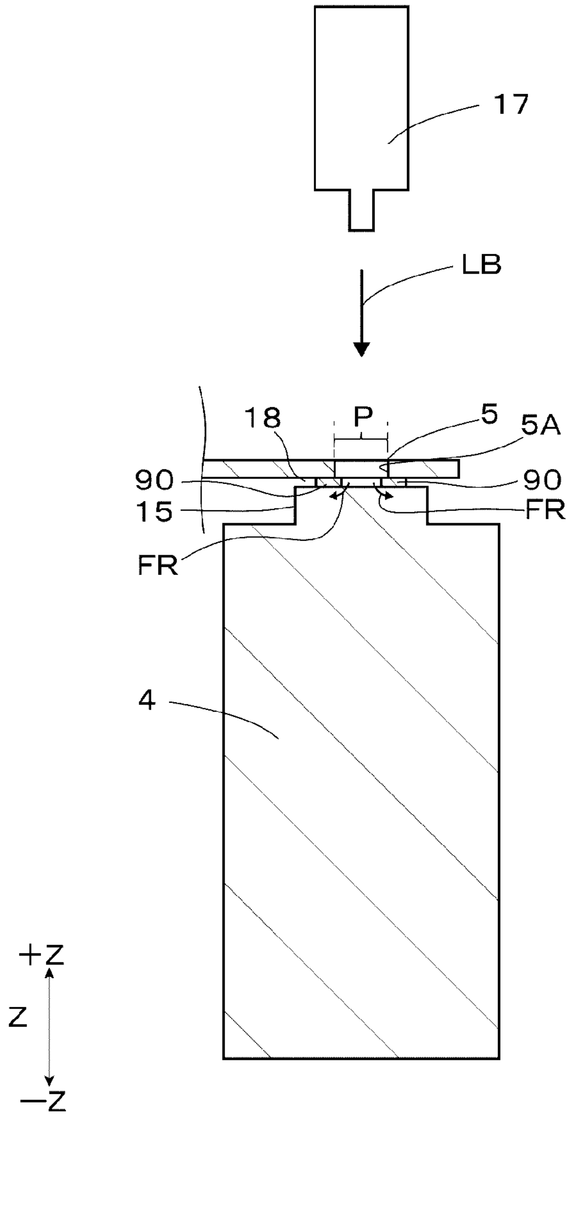
FIG. 12 is a view for illustrating a modification.

Using such a composite member 11, as shown in FIG. 12, the composite member 11 is disposed at a position facing the terminal 15 of the battery cell 4 (positioning). In the welding step, as illustrated in FIG. 12, the laser irradiation device 17 irradiates the laser LB to the metal member 9 exposed to the inner region P of the through-hole 5 of the metal member 9 from the outside of the composite member 11. At this time, at least a part of the metal material forming the metal member 9 is melted to form a molten metal material 90, and at least a part of the molten metal material 90 flows from the through-hole 5 into a gap 18 between the conductive member 3 and the terminal 15. In this state, the metal material (molten metal material 90) is solidified at the melting point or lower. At this time, the conductive member 3 and the terminal 15 are joined via the metal material forming the metal member 9, and the metal portion 6 is formed of the metal material forming the metal member 9. In this example, a part of the metal portion 6 is exposed to the inner region P, and a part thereof is located in the gap 18. In the example of FIG. 12, the entire metal member 9 is melted, and the molten metal material 90 flows in the direction of an arrow FR, but this is an example. In addition to the example of FIG. 12, for example, when the metal material forming the metal member 9 is melted, the metal material may be solidified in a state where the metal material covers the peripheral edge portion 5A of the through-hole 5. In this case, in the metal portion 6, the raised portion 14 is formed at a portion covering the peripheral edge portion 5A of the through-hole 5.

The welding step is not limited to spot welding, and may be seam welding using a laser as a heat source as illustrated in FIG. 11C. FIG. 11C is a view for illustrating an example of the laser irradiation path in the case of seam welding. In a case where the welding step is seam welding, as shown in the example of FIG. 11C, it is preferable that the laser is continuously irradiated through a rectangular spiral irradiation path SC (a rectangular spiral arrow in FIG. 11C) from the vicinity of the corner position of the exposed region AR1 toward the center. By irradiating a laser in this manner, the metal member 9 can be more uniformly melted, and it is possible to form a state in which the conductive member 3 and the terminal 15 of the battery cell 4 are more firmly joined. In FIG. 11C, the example in which the irradiation path SC has a rectangular spiral shape is illustrated, but the irradiation path SC is not limited thereto, and may have a circular spiral shape, an elliptical spiral shape, or the like. The example of FIG. 11C does not exclude the irradiation path SC having a shape other than a spiral shape.

The battery pack according to an embodiment can be used for mounting on, or supplying electric power to, an electric tool, an electric vehicle, various electronic devices, or the like. As application examples, an electric tool and an electric vehicle including the above-described battery pack 1 will be described below as examples.

Figure 13:
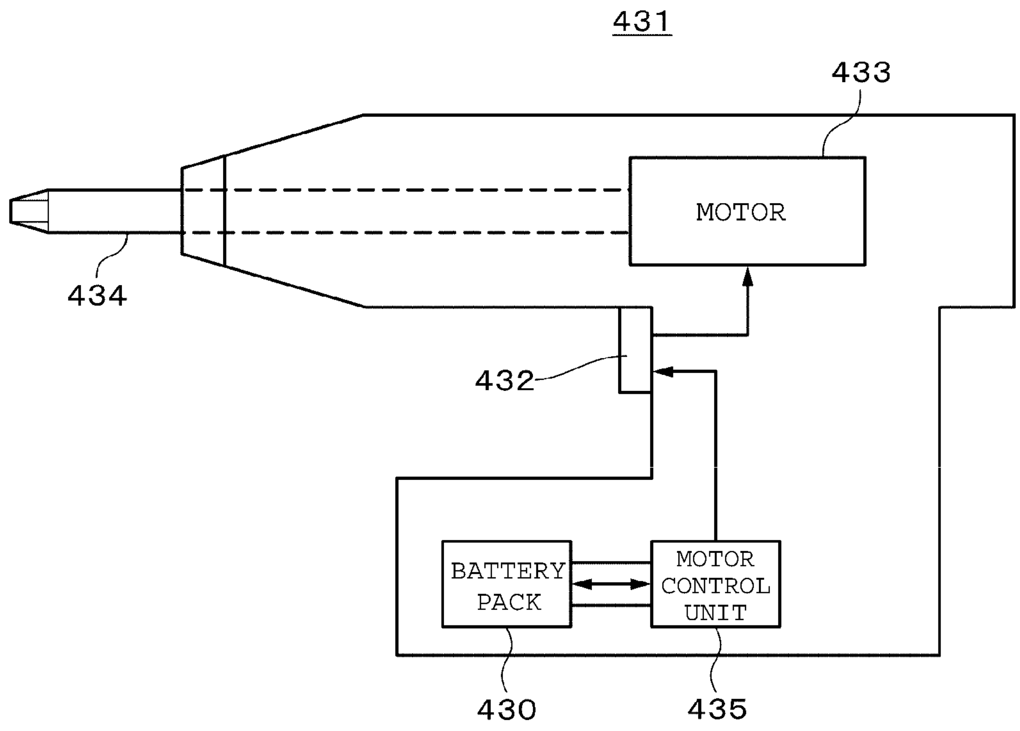
FIG. 13 is a view for illustrating an application example.

An example of an electric driver as an electric tool to which the battery back can be applied will be schematically described with reference to FIG. 13. An electric screwdriver 431 is provided with a motor 433 that transmits rotational power to a shaft 434, and a trigger switch 432 that is operated by a user. A battery pack 430 and a motor control unit 435 are housed in a lower housing of a handle of the electric screwdriver 431. The battery pack 430 is built in the electric screwdriver 431, or is detachable. The above-described battery pack can be applied to the battery pack 430.

The battery pack 430 and the motor control unit 435 may each be provided with a microcomputer (not illustrated) so that charge/discharge information of the battery pack 430 can be communicated therebetween. The motor control unit 435 can control operation of the motor 433 and cut off power supply to the motor 433 during a malfunction, such as over discharge or the like.

Figure 14:
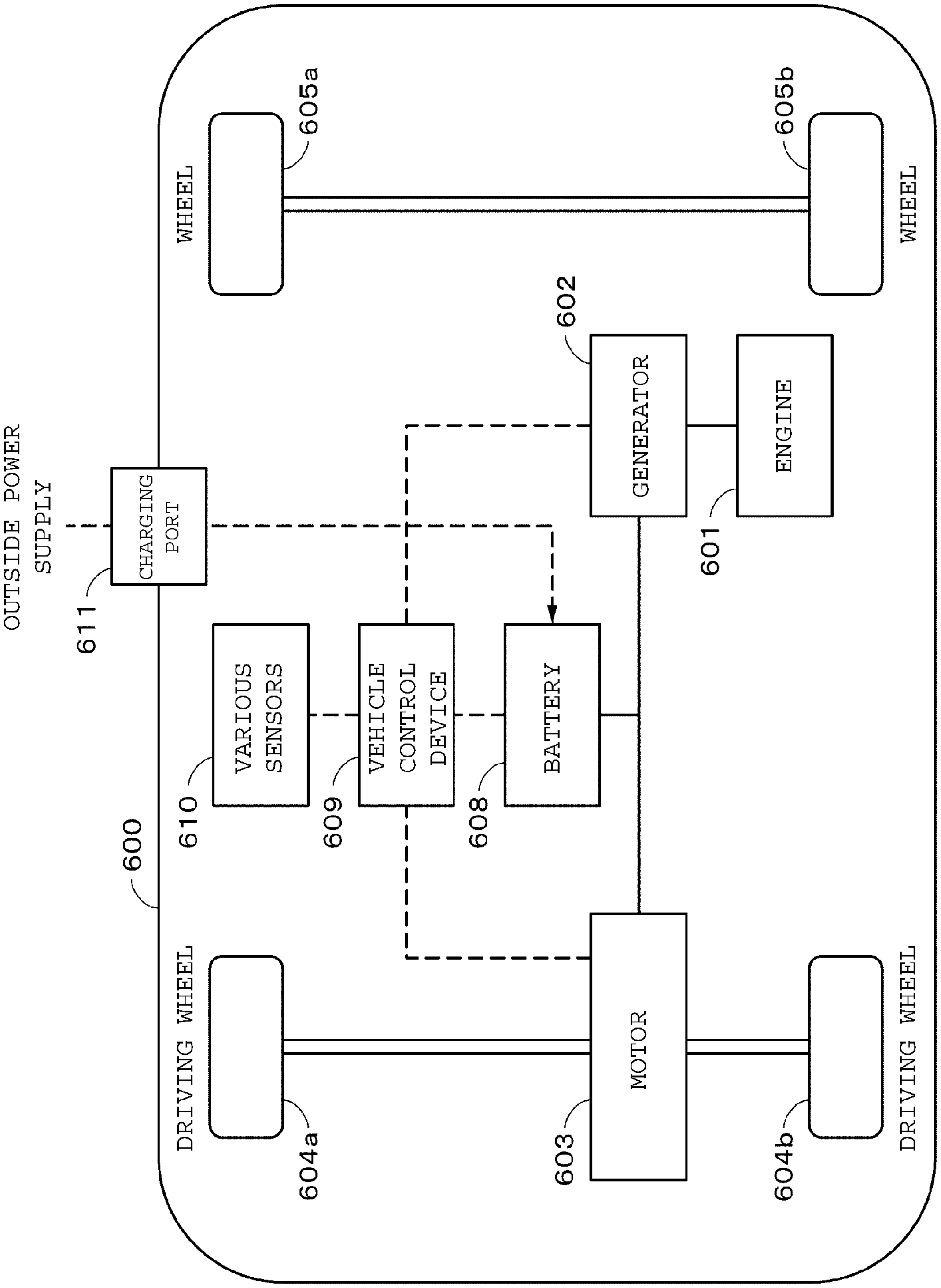
FIG. 14 is a view for illustrating an application example.

As an example in which the present application is applied to an electric vehicle power storage system, FIG. 14 schematically shows a configuration example of a hybrid vehicle (HV) employing a series hybrid system. The series hybrid system is a car travelling with an electric power driving force converter using electric power generated by a generator powered by an engine or electric power obtained by temporarily storing the generated electric power in a battery.

A hybrid vehicle 600 is mounted with an engine 601, a generator 602, an electric power driving force converter (a direct-current motor or an alternate-current motor; hereinafter, simply referred to as "motor 603"), a driving wheel 604*a*, a driving wheel 604*b*, a wheel 605*a*, a wheel 605*b*, a battery 608, a vehicle control device 609, various sensors 610, and a charging port 611. As the battery 608, the battery pack or a power storage module on which a plurality of the battery packs are mounted can be applied according to an embodiment.

The motor 603 is operated by the electric power of the battery 608, and a rotating force of the motor 603 is transmitted to the driving wheels 604*a* and 604*b*. Electric power generated in the generator 602 by the rotating force produced by the engine 601 can be stored in the battery 608. The various sensors 610 control an engine speed via the vehicle control device 609, or control the opening degree of a throttle valve (not illustrated).

When the hybrid vehicle 600 decelerates by a braking mechanism (not illustrated), a resistance force during the deceleration is applied as a rotating force to the motor 603, and regenerative electric power generated due to the rotating force is stored in the battery 608. The battery 608 can be charged by being connected to an external power supply via the charging port 611 of the hybrid vehicle 600. Such a HV vehicle is referred to as a plug-in hybrid vehicle (PHV or PHEV).

The battery pack according to an embodiment can also be applied to a downsized primary battery and used as a power supply of a tire pressure monitoring system (TPMS) built in wheels 604 and 605.

Although a series hybrid vehicle has been described above as an example, the present application is also applicable to a hybrid vehicle of a parallel system using an engine and a motor together or a hybrid vehicle in which a series system and a parallel system are combined. Moreover, the present application can also be applied to an electric vehicle (EV or BEV) that travels using only a drive motor without using an engine, and a fuel cell vehicle (FCV).

Although the embodiments including the manufacturing method and the application example of the present application have been described herein, the present application is not limited thereto, and various modifications can be made.

For example, the configurations, methods, steps, shapes, materials, numerical values, and the like mentioned in the above-described embodiments, manufacturing methods, and application examples are merely examples, and different configurations, methods, steps, shapes, materials, numerical values, and the like may be used as necessary. In addition, the configurations, methods, steps, shapes, materials, numerical values, and the like of the above-described embodiments, manufacturing methods, and application examples can be combined with each other according to an embodiment.

DESCRIPTION OF REFERENCE SYMBOLS

1: Battery pack
2: Assembled battery structure
3: Conductive member
3A: Outer surface
3B: Inner surface
4: Battery cell
5: Through-hole
5A: Peripheral edge portion
6: Metal portion
9: Metal member
10: Joining portion
11: Composite member
12A: Through-hole
12B: Through-hole
12C1: Through-hole
12C2: Through-hole
12C3: Through-hole
12C4: Through-hole
12C5: Through-hole
13: Intervening portion
14: Raised portion
15: Terminal
17: Laser irradiation device
104: Lithium ion battery It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack comprising:

a plurality of battery cells each having a terminal; and a conductive member electrically connected to the plurality of battery cells, wherein the conductive member has an outer surface and an inner surface facing the terminal of one of the plurality of battery cells, wherein a metal portion having a melting point of 85° C. or higher and 450° C. or lower is provided at least between the inner surface of the conductive member and the terminal of the one of the plurality of battery cells, and electrically connects the conductive member and the terminal, wherein the conductive member has a through-hole extending from the outer surface to the inner surface at a position facing the terminal, wherein the metal portion covers at least a part of an opening of the through-hole on the inner surface side and is exposed through the through-hole from the outer surface side, and wherein the metal portion is interposed between a surface of the terminal and the inner surface of the conductive member without extending through a through-hole of the terminal.

2. The battery pack according to claim 1, wherein the metal portion is a brazing material.

3. The battery pack according to claim 1, wherein the metal portion contains at least one metal material selected from the group consisting of zinc, indium, tin, lead, bismuth, and eutectic solder.

4. The battery pack according to claim 1, wherein the through-hole is formed in a shape selected from the group consisting of a rectangular shape, a circular shape, an elliptical shape, a cross shape, and a star shape.

5. The battery pack according to claim 1, wherein the metal portion has a raised portion formed of the metal portion and covering at least a part of a peripheral edge portion of the through-hole.

6. The battery pack according to claim 1, having a plurality of through-holes separated from each other, wherein each of the plurality of through-holes exposes at least a part of the metal portion.

7. The battery pack according to claim 1, having a joining portion that joins the terminal and the metal portion, wherein, seen in a direction from the metal portion toward the terminal, at least a part of the joining portion is formed in an inner region of the through-hole.

8. An electric vehicle comprising the battery pack according to claim 1.

9. An electric tool comprising the battery pack according to claim 1.

10. A method for manufacturing a battery pack, the method comprising:

forming, before disposition to a battery cell, a composite member having:

a conductive member with a through-hole formed therein, the conductive member having an outer surface and an inner surface; and a metal member having a melting point of 85° C. or higher and 450° C. or lower, the metal member being provided on the inner surface side of the conductive member so as to cover an inner region of the through-hole and so as to be exposed through the through-hole from the outer surface side;

disposing the composite member to a battery cell having a terminal such that the metal member and the terminal face each other; and irradiating an exposed region of the metal member with a laser through the through-hole from the outer surface side of the conductive member to melt the metal member and weld the terminal and the metal member.

* * * * *